United States Patent [19]

Dahl et al.

[11] Patent Number: 5,263,068
[45] Date of Patent: Nov. 16, 1993

[54] METHOD FOR ARRANGING THE POWER TERMINALS OF COILS IN ANNULAR FLOW ELECTROMAGNETIC PUMPS FOR NUCLEAR FISSION REACTORS

[75] Inventors: Leslie R. Dahl, Livermore; Alan W. Fanning, San Jose, both of Calif.

[73] Assignee: General Electric Company, San Jose, Calif.

[21] Appl. No.: 818,944

[22] Filed: Jan. 10, 1992

[51] Int. Cl.$^5$ .............................................. G21C 15/00
[52] U.S. Cl. ..................... 376/361; 376/404; 310/11; 417/50
[58] Field of Search .................. 376/361, 404; 310/11; 417/50

[56] References Cited

U.S. PATENT DOCUMENTS

| | | | |
|---|---|---|---|
| 4,219,385 | 8/1980 | Guidez et al. | 376/174 |
| 4,508,677 | 4/1985 | Craig et al. | 376/174 |
| 4,859,885 | 8/1989 | Kliman et al. | 310/11 |
| 4,882,514 | 11/1989 | Brynsvold et al. | 310/11 |
| 5,017,102 | 5/1991 | Shimaguchi et al. | 376/404 |

Primary Examiner—Donald P. Walsh
Assistant Examiner—Frederick H. Voss
Attorney, Agent, or Firm—John S. Beulick

[57] ABSTRACT

Stator coils for linear flow electromagnetic induction pumps for pumping liquid metal circulating through a hydraulic system are provided with advantageous deployments of coil power terminals and leads.

10 Claims, 3 Drawing Sheets

METHOD FOR ARRANGING THE POWER TERMINALS OF COILS IN ANNULAR FLOW ELECTROMAGNETIC PUMPS FOR NUCLEAR FISSION REACTORS

FIELD OF THE INVENTION

This invention is concerned with an improvement in annular linear flow electromagnetic induction pumps such as the type commonly used to circulate liquid metal coolant through a liquid metal cooled nuclear fission reactor plant. Such coolant circulating pumps and liquid metal cooled nuclear fission reactors, and their operation and function in this service are disclosed in U.S. Pat. No. 4,508,677, issued Apr. 2, 1985, for example.

BACKGROUND OF THE INVENTION

Annular linear flow electromagnetic induction pumps for impelling electrically conducting liquid metals generally comprise an annular flow channel or duct which is surrounded by a column composed of a multiplicity of alternating annular stator coils and magnetic stator iron. This type of electromagnetic pump, commonly known as a single stator, annular linear flow induction pump, and its use in a liquid metal cooled nuclear fission reactor, is disclosed in U.S. Pat. No. 4,859,885, issued Aug. 22, 1989, and U.S. Pat. No. 4,882,514, issued Nov. 21, 1989.

However a more versatile linear flow electromagnetic pump design than the single stator system shown in the above patents comprises a double stator system. This type of electromagnetic pump comprises the single stator arrangement as shown in the aforesaid patents, which is additionally provided a second or inner stator arrangement concentrically contained and enclosed within the aforementioned central linear liquid flow channel or duct. A second stator column is also composed of a multiplicity of alternating annular stator coils and stator irons. In combination, the outer and inner, or double stators act upon the liquid linearly passing through the annular pump flow duct.

The double stator arranged electromagnetic pump design provides greater pumping capacity per pump unit size, or alternatively equal capacity provided by a smaller pump unit. Accordingly the double stator design pump has the advantage of greater efficiency and versatility, among others.

The disclosures and contents of the aforesaid patents, namely U.S. Pat. No. 4,508,677, U.S. Pat. No. 4,859,885 and U.S. Pat. No. 4,882,514, are each incorporated herein by reference.

SUMMARY OF THE INVENTION

This invention comprises an improved means in the assembly of annular stator coils for annular linear flow electromagnetic induction pumps suitable for service submerged within electrically conducting liquid metal coolant of a nuclear fission reactor plants to circulate the liquid metal coolant through a cooling circuit. The invention comprises a method for deploying the power terminal of the annular stators employed in such electromagnetic induction pumps in a manner or array that is more effective space-wise and facilitates assembly. The invention also includes deploying power connections for wiring the electromagnetic stator coil into induction pump assemblies in a non-complex arrangement within minimum space.

DETAILED DESCRIPTION OF THE INVENTION

Figure 1:
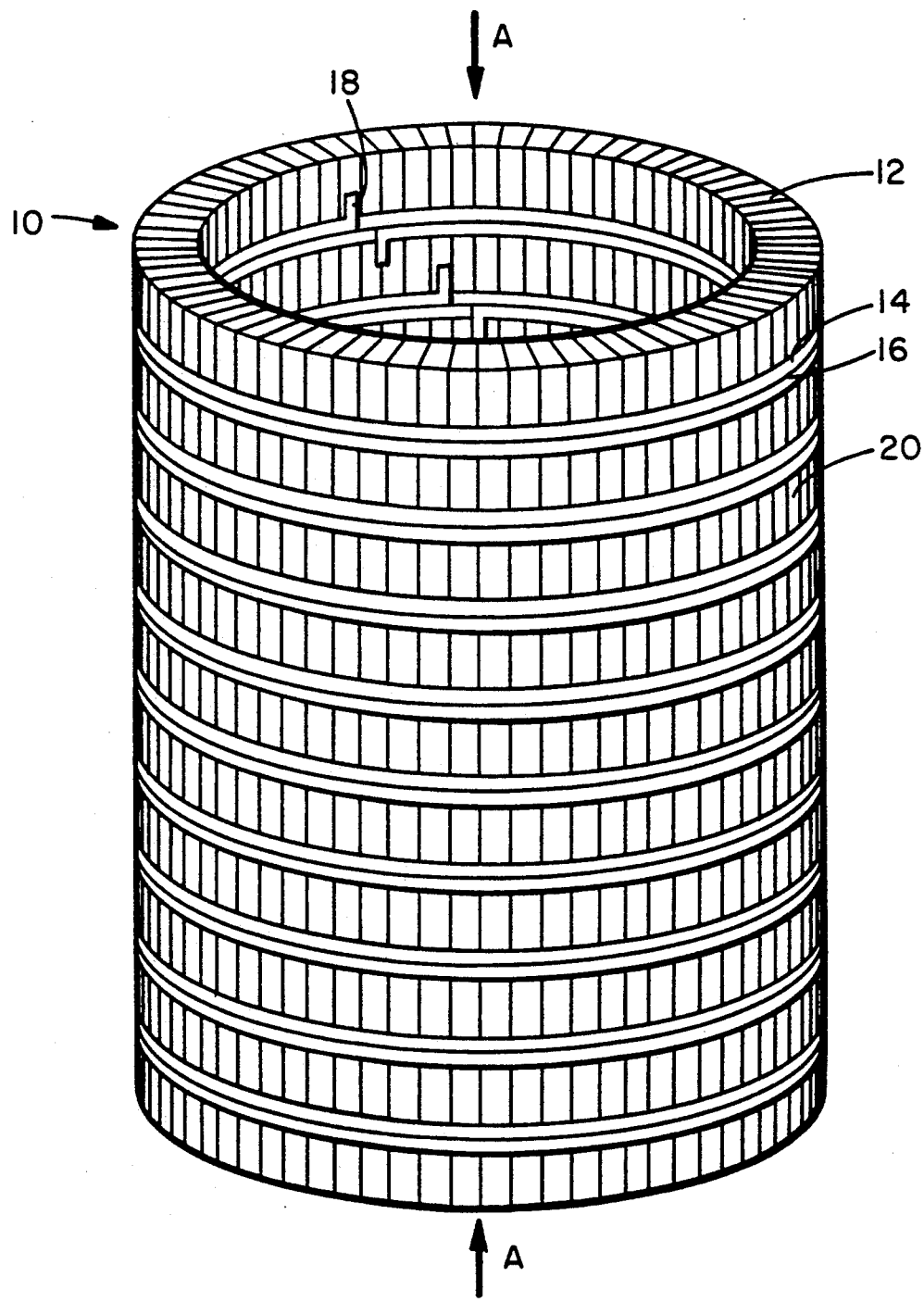
FIG. 1 comprises a perspective drawing of an annular stator column for use in an electromagnetic pump.

Referring to the drawings, FIG. 1 in particular, an annular stator coil unit 10 for use in a typical linear flow electromagnetic induction pump, for service in electrically conducting liquid systems typically comprises an annular stator column 12 composed of a multiplicity of annular stator components. Annular stator column 12 includes stator coils 14 of wound copper conductors 16, having laterally emerging power terminals 18, alternately stacked or arranged with stator iron rings 20. Typically the stator coils 14 are formed of copper strips or tapes wound upon itself, including superimposed in two tiers or layers of such windings, with the power terminal 18 emerging outward laterally from a side of the coil winding, either radially from its outside perimeter face or inward towards its center from the inside face, depending upon the service location of the annular stator coil unit incorporating the coil winding. The stator iron rings 20 are commonly assembled from discrete iron elements combined into a composite ring, as shown in the prior art. As illustrated in FIG. 1, annular stator coils 14 and stator iron rings 20 are alternately stacked upon each other to form a column 12 providing the annular stator coil unit 10.

Figure 3:
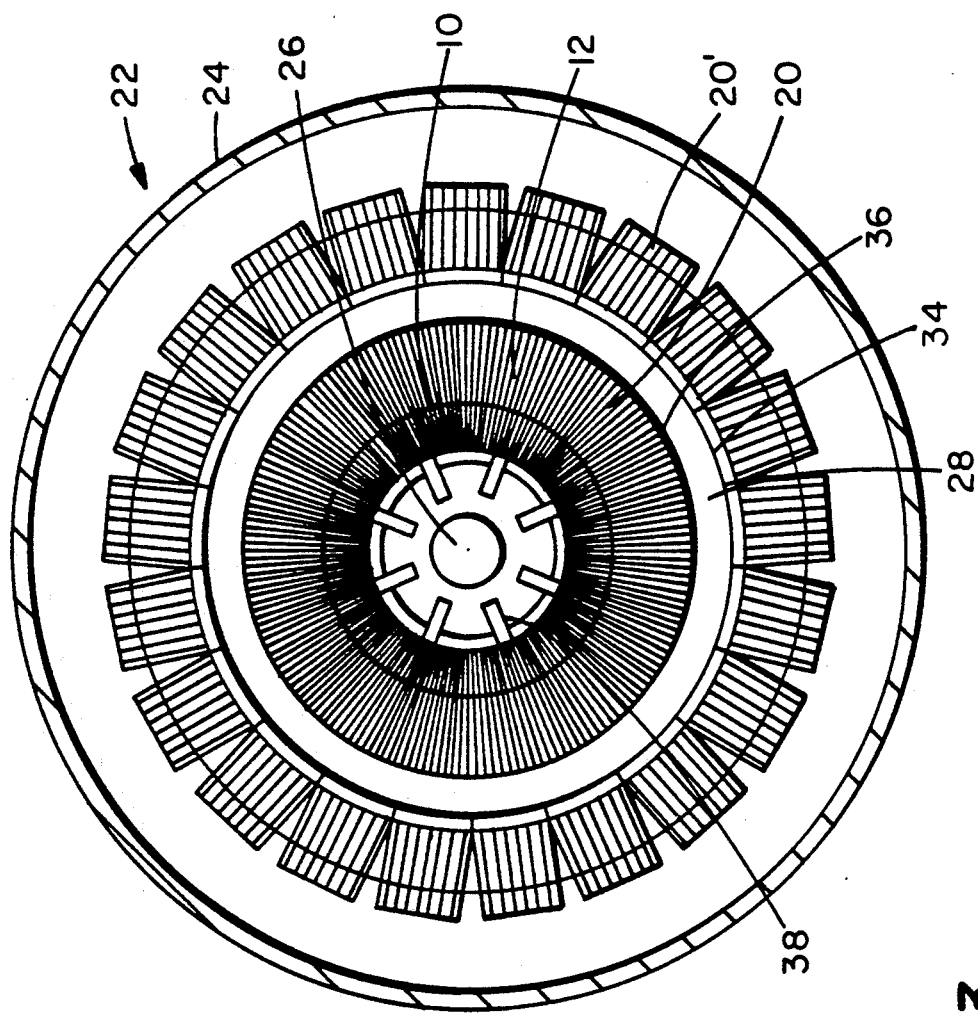
FIG. 3 comprises a cross-sectional view of a typical double stator electromagnetic induction pump.

Annular stator coil units 10 such as illustrated in FIG. 1 can be employed in electromagnetic induction pumps as shown in the prior art, and in particular in double stator electromagnetic induction pumps as shown in cross-section in FIG. 3.

Briefly typical linear flow electromagnetic induction pumps 22 comprise a housing 24 enclosing the pump mechanism which is secured in a composite unit by means of the pump housing 24 and/or a center support post 26. The linear flow pump 22 is provided with an annular flow channel 28 having an inlet at one end and an outlet at the other end. Annular flow channel 28 is defined by outer flow conduit 34 and inner flow conduit 36 which is of smaller diameter than channel 34 and is concentrically positioned in channel 34.

In a single stator unit linear flow electromagnetic induction pump, a single annular stator coil unit surrounds the outer flow conduit 34, and a simple magnetic conducting core can be included inside of the inner flow conduit 36, as shown in U.S. Pat. No 4,859,885. With the double stator linear flow electromagnetic induction pumps, as shown in FIG. 3, in addition to the annular stator coil unit surrounding the outer flow conduit 34, a second annular stator coil unit 10 is enclosed within and surrounded by the inner flow conduit 36. This double stator coil design enhances pumping capacity or alternatively provides comparable capacity from a smaller pump. However, the annular stator coil units 10 for either position or pump type can be similar, except for the positioning of the stator coil power terminals 18, due to opposite arrangements of the flow paired conduits 34 and 36 defining the annular flow channel 28 in combination with the stator coils. Namely the stator coil unit 10 of a single coiled pump or outer stator of a double stator pump comprises an annular stator column which closely surrounds the outer flow conduit 34 whereby the power terminals 18 and power supplying leads 38 must be located on the outside face of the column, and conversely, with the second stator coil of a double coil pump, the inner flow conduit 36 closely surrounds the outside surface of the second or inner annular stator coil unit 10 whereby the power terminals 18 and power supplying leads 38 must be located on the inside face of the column.

In any case the measures of this invention are applicable to both single stator and double stator, linear flow electromagnetic induction pumps of the type described and referred to herein.

Figure 2:
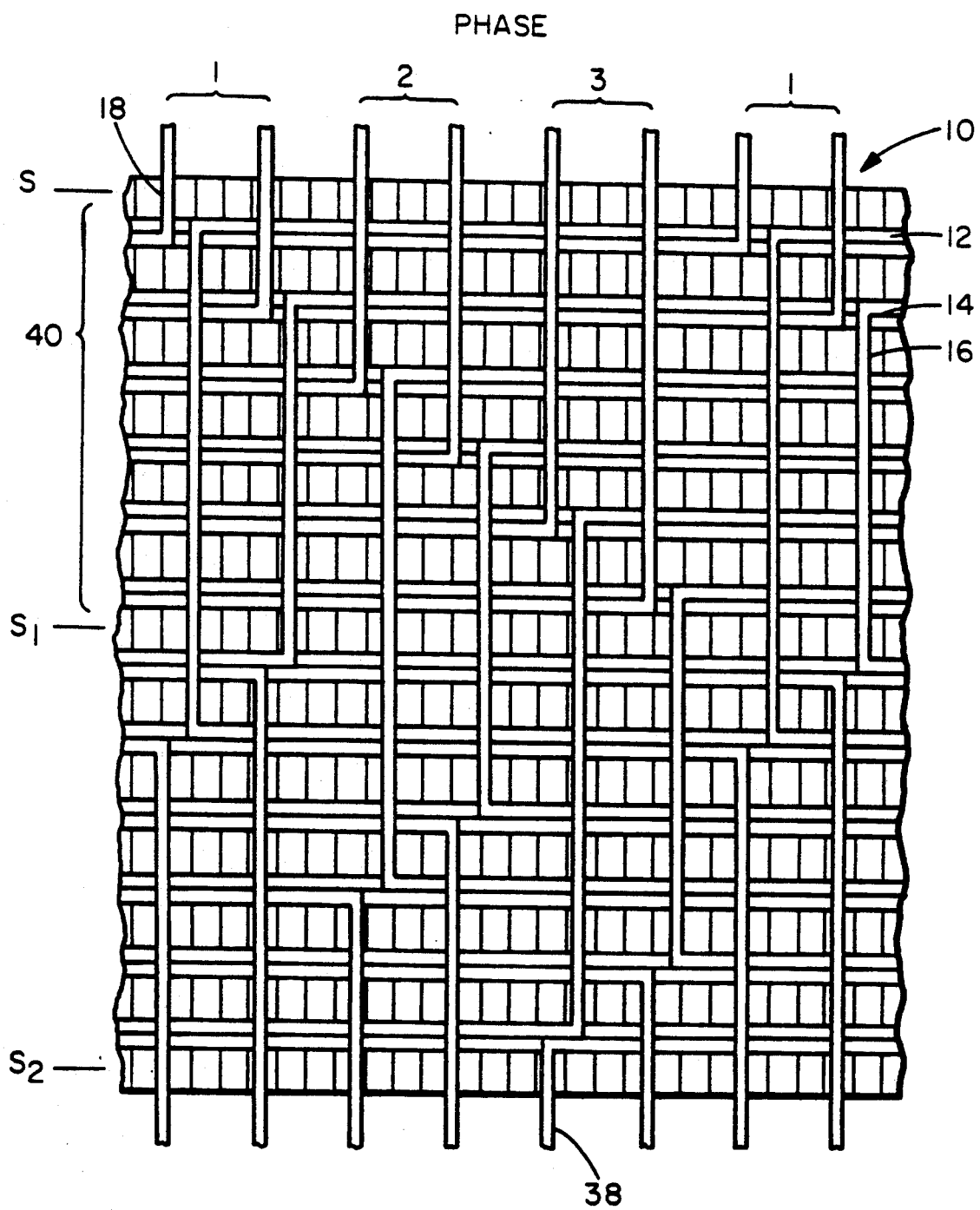
FIG. 2 comprises a view of the annular stator column of FIG. 1 split along lines A—A and the annular configuration straightened into a flat view illustrating the power terminal deployment.

Referring to FIG. 2, representing a longitudinal splitting open of the annular stator coil unit 10 of FIG. 1 along line A—A and flattening the coil unit to expose its interior surface, or an exterior surface of a single coil pump or external surface of a double coil pump, this invention comprises the following means.

In accordance with this invention the power terminals 18 emerging from each copper stator coil 14 of the column 12 forming the composite annular stator coil unit 10, on either the inside face of the coils 14 or their outside face, are deployed by circumferentially aligning each stator coil 14 in the annular stator coil unit 10, with its laterally emerging power terminal(s) 18 extending from the assembled annular coil unit 10 in a sequence of substantial uniform vertical offsets forming a spiral pattern or array of a substantially complete circle around the assembled stator column 12. This coil stator 14 arrangement placing the emerging power terminals 18 emerging from each copper coil 14 in a pattern comprising a cascading step-wise spiral around the assembled stator column 12 evenly disperses the terminals 18 and connecting power leads 38, or bussbars, over the respective surface of the annular stator column 12 in a uniformly separated space saving deployment which can be applied in a smaller area.

Commonly the annular stator coil unit 10 for linear flow electromagnetic induction pumps are designed and constructed in multiple vertically arranged segments 40 consisting of repeating groups of stator coils 14 and stator iron rings, such as shown in FIG. 2 as segment S-S₁, and S₁-S₂, etc. Thus, in each segment 40 of an annular stator coil unit 10, the induction stator coils 14 are circumferentially aligned with respect to the other stator coils of the same segment to deploy their respective emerging power terminal 18 in an array of the same substantially uniform vertical series of offsets forming a spiral pattern comprising a substantially complete circle or one convolution around the segment 40 of the column 12. This deployed array is substantially repeated for each of the segments 40 with corresponding components of each segment likewise vertically aligned. This arrangement provides for sequential magnetic impulses repeating along the length of flow channel 28. In this design or array the power lead 38 can extend bridging from on coil 14 in a segment 40 to a corresponding coil 14' aligned in the same vertical arrangement in an adjacent segment 40' of the annular stator column 12. This replication of vertically arranged segments 40 and corresponding power terminal 18 deployment and power lead 38 alignment can be carried to any apt number of segments for a given service, and the more segments the more effective and practical the invention.

What is claimed is:

1. A method for deploying the power terminals of an annular stator coil for annular linear flow electromagnetic induction pumps for service with an electrically conducting liquid metal to circulate the liquid metal through a hydraulic system, comprising the combination of steps of:

assembling a stator for an annular linear flow electromagnetic pump comprising an annular stator column of a multiplicity of annular stator components including stator coils having laterally emerging power terminals alternatively stacked horizontally with stator iron rings, and arranging the horizontally stacked stator column in at least one segment of the alternating multiple coils and iron rings with coils of each segment circumferentially aligned in the column segment having their laterally emerging power terminals extending from the coils of the segment in a sequence of substantially uniform vertical offsets forming a spiral pattern of a substantially complete circle around the assembled stator column.

2. The method for deploying the power terminals of an annular stator coil for an annular linear flow electromagnetic induction pump of claim 1, wherein the assembled stator column of a multiplicity of annular stator components including stator coils alternately stacked horizontally with stator iron rings is arranged into a plurality of segments of alternating multiple coils and iron rings with the coils of each segment circumferentially aligned in the column segment having their laterally emerging power terminals extending from the coils of each segment in a sequence of substantially uniform vertical offsets forming a spiral pattern of a substantially complete circle around the assembled stator column whereby the coil with their laterally emerging power terminals of each segment are arranged in a substantially duplicated spiral pattern with the coils of other segments of the column.

3. The method for deploying the power terminals of an annular stator coil for an annular linear flow electromagnetic induction pump of claim 1, wherein the spirally offset power terminals emerging from the stator coils of a segment of the assembled annular stator column are connected to power leads running parallel to the longitudinal axis of the column and extending from the coil terminals aligned longitudinally about the annular column in substantially uniform spacing parallel to each other.

4. The method for deploying the power terminals of an annular stator coil for an annular linear flow electromagnetic induction pump of claim 1, wherein the assembled laterally emerging power terminals of the stator coils of the assembled stator column extend inward toward the center of the column.

5. A method for deploying the power terminals of an annular stator coil for annular linear flow electromagnetic induction pumps for service with an electrically conducting liquid metal to circulate the liquid metal through a hydraulic system, comprising the combination of steps of:

assembling a stator for an annular linear flow electromagnetic pump comprising an annular stator column of a multiplicity of annular stator components including stator coils of wound copper strands having laterally emerging power terminals alternately stacked horizontally with stator iron rings, and arranging the horizontally stacked stator column in a plurality of segments of alternating multiple coils and iron rings with the coils of each segment circumferentially aligned in their respective column segments having their laterally emerging power terminals extending from the coils of each segment in a sequence of substantially uniform vertical offsets forming a spiral pattern of a substantially complete circle around the assembled stator column whereby the coil with their laterally emerging power terminals of each segment are arranged in a substantially duplicated spiral pattern with the coils of other segments of the assembled column.

6. The method for deploying the power terminals of an annular stator coil for an annular linear flow electromagnetic induction pump of claim 5, wherein the spirally offset power terminals emerging from the stator coils of each segment of the assembled annular stator column are connected to power leads running parallel to the longitudinal axis of the column and extending from the coil terminals aligned longitudinally around the annular column in substantially uniform spacing parallel to each other.

7. The method for deploying the power terminals of an annular stator coil for an annular linear flow electromagnetic induction pump of claim 5, wherein the laterally emerging power terminals of the stator coils of the assembled stator column extends inward toward the center of the column.

8. The method for deploying the power terminals of an annular stator coil for an annular linear flow electromagnetic induction pump of claim 7, wherein the inward extending power terminals emerging from the stator coils are connected to power leads running within the annular stator column parallel to the longitudinal axis of the column and extending from the coil terminals aligned longitudinally around the inside of the annular column in substantially uniform spacing parallel to each other.

9. The method for deploying the power terminals of an annular stator coil for an annular linear flow electromagnetic induction pump of claim 5, wherein the laterally emerging power terminals of the stator coils of the assembled stator column extend outward from the outer perimeter of the column.

10. The method for deploying the power terminals of an annular stator coil for an annular linear flow electromagnetic induction pump of claim 9, wherein the outward extending power terminals emerging from the stator column are connected to power leads running outside of the annular stator column parallel to the longitudinal axis of the column and extending from coil terminals aligned longitudinally round the outside of the annular column in substantially uniform spacing parallel to each other.

* * * * *